(12) United States Patent
Zhang

(10) Patent No.: US 12,450,111 B2
(45) Date of Patent: Oct. 21, 2025

(54) SYSTEM AND METHOD FOR ONE-WIRE NON-VOLATILE MEMORY

(71) Applicant: Giantec Semiconductor Corporation, Shanghai (CN)

(72) Inventor: Xiao Tian Zhang, Shanghai (CN)

(73) Assignee: GIANTEC SEMICONDUCTOR CORPORATION, Shanghai (CN)

( * ) Notice: Subject to any disclaimer, the term of this patent is extended or adjusted under 35 U.S.C. 154(b) by 0 days.

(21) Appl. No.: 18/610,696

(22) Filed: Mar. 20, 2024

(65) Prior Publication Data

US 2025/0173205 A1    May 29, 2025

(51) Int. Cl.
*G06F 11/07* (2006.01)
*G06F 9/448* (2018.01)

(52) U.S. Cl.
CPC .......... *G06F 11/073* (2013.01); *G06F 9/4498* (2018.02); *G06F 11/0757* (2013.01)

(58) Field of Classification Search
CPC ... G06F 11/073; G06F 9/4498; G06F 11/0757
See application file for complete search history.

(56) References Cited

U.S. PATENT DOCUMENTS

| | | | | |
|---|---|---|---|---|
| 8,843,695 B2* | 9/2014 | Shao | ...................... | G11C 16/22 711/E12.103 |
| 2006/0242488 A1* | 10/2006 | You | ...................... | G06F 11/1068 714/718 |
| 2014/0226408 A1* | 8/2014 | Tokiwa | .................. | G11C 7/222 365/185.18 |
| 2017/0031436 A1* | 2/2017 | Wu | .......................... | A61B 3/11 |
| 2022/0083371 A1* | 3/2022 | O'Reilly, Jr. | .......... | G06F 9/4881 |
| 2022/0399865 A1* | 12/2022 | Valle | .................... | H03G 3/3005 |
| 2023/0117637 A1* | 4/2023 | Li | .............................. | G06F 1/30 714/730 |
| 2025/0060776 A1* | 2/2025 | Mishra | ................ | G06F 13/4291 |

* cited by examiner

*Primary Examiner* — Albert Decady
*Assistant Examiner* — Osman M Alshack
(74) *Attorney, Agent, or Firm* — Yuan Qing Jiang

(57) ABSTRACT

A system and method for one-wire non-volatile memory are provided. The system comprises a one-wire communication interface coupled with a single-wire serial bus and a non-volatile memory to process data communication according to one-wire communication protocol. The one-wire communication interface comprises an interface controller, an internal clock oscillator, a first and a second state machine. The second state machine is driven by a first clock signal generated by the internal clock oscillator and is configured to process bit signal communicated on the serial bus via the interface controller. The first state machine is coupled to the second state machine, and is driven by a second clock signal defined by the falling edge of the data signal on the serial bus. The first state machine is configured to process byte information received from the second state machine.

6 Claims, 8 Drawing Sheets

SYSTEM AND METHOD FOR ONE-WIRE NON-VOLATILE MEMORY

CROSS-REFERENCE TO RELATED APPLICATIONS

This application claims priority to Chinese Patent Application No. CN202311613080.3 filed on Nov. 29, 2023, the entire contents of which are hereby incorporated by reference.

BACKGROUND OF THE INVENTION

The present invention relates generally to one-wire serial communication interface, more particularly to one-wire serial communication interface for non-volatile semiconductor memory devices.

Nonvolatile memory devices such as EEPROM (erasable programmable read-only memory) devices have low power consumption and have been widely used in applications of portable devices such as portable computers, personal digital assistant devices, digital cameras, and cellular phones. The nonvolatile memory devices have the capability of preserving data even when the power supply of the device is turned off.

Generally, a traditional nonvolatile memory device may have serial bus or parallel bus interfaces to communicate with an external master device. The most common serial interface types are SPI, I2C, Microwire, UNI/O and one-wire. These interfaces require between one and four control signals for operation and may result in a memory device package having 8 or less pins.

A one-wire bus uses only one wire for signaling and power. A single master device communicates with one or more one-wire peripheral devices over the single data line, which can also be used to provide power to the peripheral devices. For a nonvolatile memory device, it is desirable to have a communication interface with a fewer number of connection pin. This architecture advantageously provides low-cost nonvolatile memory chips with reduced pin count and easier power management. However, as memory operation requires high performance for the serial bus communication in terms of efficiency and error handling, there is a demand for an advanced interface system.

SUMMARY OF THE INVENTION

According to aspects illustrated here, there is provided a one-wire nonvolatile memory system with improved performance in terms of reliability and efficiency.

In various aspect, the present disclosure provides a system comprising: a one-wire communication interface coupled with a single-wire serial bus and a non-volatile memory to process data communication according to one-wire communication protocol. The one-wire communication interface comprises an interface controller, an internal clock oscillator, a first and a second state machine. Wherein the interface controller is coupled to one-wire serial bus, and the first and the second state machine. The second state machine is coupled to and driven by a first clock signal generated by the internal clock oscillator and is configured to process bit signal communicated on the serial bus via the interface controller. The first state machine is coupled to the second state machine, and is driven by a second clock signal defined by the falling edge of the data signal on the serial bus. The first state machine is configured to process byte information received from the second state machine.

In various aspect of the present invention, the first state machine of the one-wire communication interface comprises: an idle state, a command state, an address state, a wait state, a read state, a write state, and a high voltage state. The second state machine comprises an idle state, a wait state, a sample state, a drive state, a release state, and a stop state.

In various aspect of the present invention, the process of reading one bit data from a memory by the second state machine starts from the idle state. During the first segment of a bit frame, the master device drives the one-wire serial bus to a low level, the second state machine changes to the wait state until it receives the read or write state information from the first state machine. During the second segment of the bit, the second state machine changes to the drive state or the sample state for a memory read or write operation respectively. Wherein the second state machine controls the signal level on the bus via the interface controller for the memory read operation. For a memory write operation, the second state machine collects and saves the received bits in an internal buffer for the first state machine to perform memory write operation. During the third segment of the bit, the second state machine changes to the release state to release the control on the serial bus which allows the bus to float to a high level, providing charging opportunity for the system. At the end of the third segment of the bit, the second state machine changes to the stop state and then returns to the idle state upon the next SDA signal.

In various aspect of the present invention, the first state machine receives and analyses bit information from the second state machine, and proceeds to the command state, the address state, and the read or write state according to the one-wire communication protocol. For a memory write operation, the first state machine changes from the write state to the wait state to wait for the second state machine to collect all the data bit on the serial bus until it receives a stop bit at the correct position in the byte sequence, causing the first state machine to change from the wait state to the high voltage state to perform erase and write operation in the addressed portion of the nonvolatile memory.

In various aspect of the present invention, the one-wire communication interface further comprises a data receiving block, a data transmission block, and a first and a second counter. The data receiving block is coupled with the interface controller and the second state machine, and is configured to receive the bit information on the serial bus and to transmit the information to the second state machine. The data transmission block is coupled with the interface controller and the second state machine, and is configured to transmit bit information received from the second state machine to the single-wire serial bus. The first counter is coupled with the interface controller and the first state machine, and is configured to monitor the number of bits received by the first state machine and the order of the bit in a byte to ensure data integrity. The second counter is coupled to the internal clock and the second state machine to monitor the time interval of a bit frame.

BRIEF DESCRIPTION OF DRAWINGS

A more complete appreciation of the invention and many of the attendant advantages thereof will be readily obtained and understood by referring to the following detailed description and the accompanying drawings in which like reference numerals denote like elements as between the various drawings. The drawings, briefly described below, are not to scale.

DETAILED DESCRIPTION OF THE INVENTION

Figure 1:
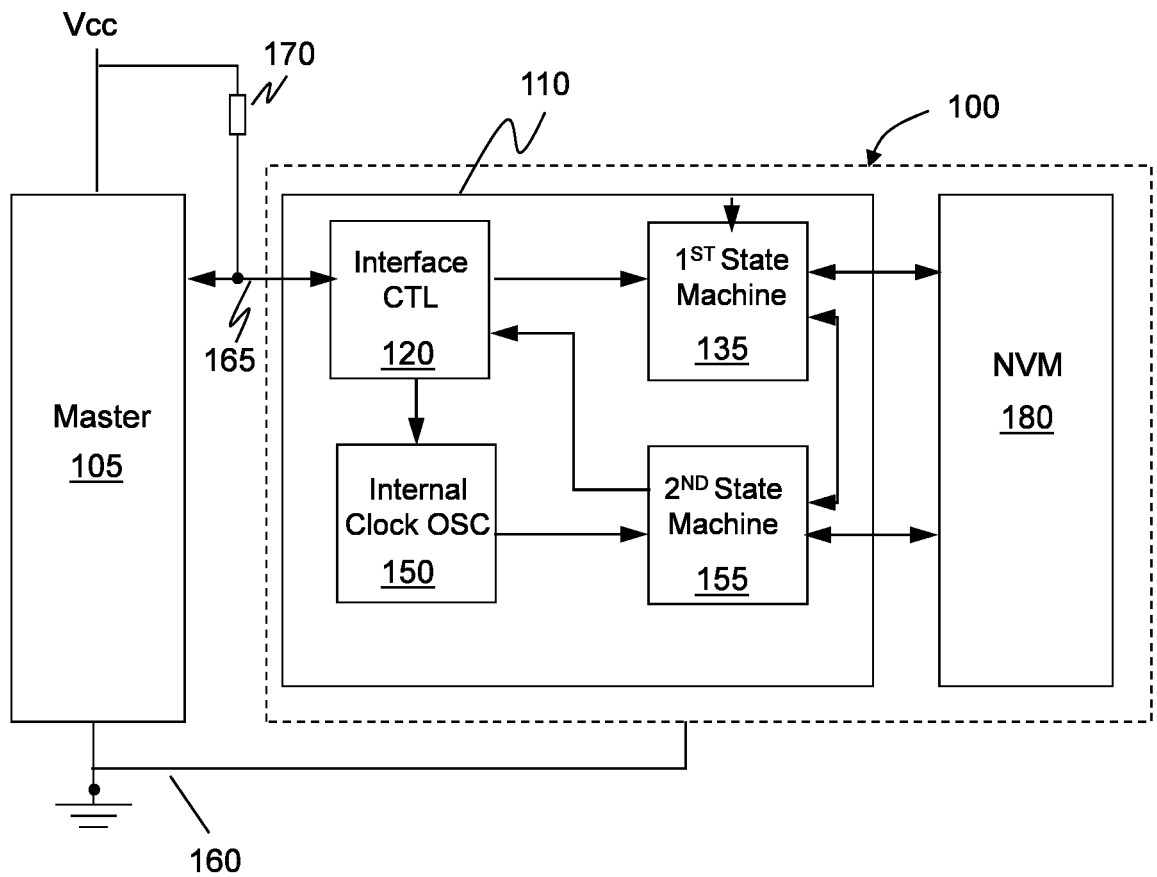
FIG. 1 is a functional block diagram illustrating a one-wire nonvolatile memory system according to an embodiment of the present invention.

The present invention provides a system and related methods for one-wire serial communication interface to non-volatile semiconductor memory devices. Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one ordinary skill in the art and having possession of this disclosure, are to be considered within the scope of the invention.

FIG. 1 is a functional block diagram illustrating a one-wire nonvolatile memory system according to an embodiment of the present invention. Herein, a non-volatile memory device is a memory device that is not erasable unintentionally even when its electrical power supply is turned off. Examples of these memories include EEPROM (Electrically Erasable Programmable Read-Only Memory) and flash memory. A memory device with a one-wire communication interface is also referred as a "one-wire memory device" or "one-wire memory system". In one embodiment, the one-wire memory device 100 is fabricated as an integrated circuit (IC).

With reference to FIG. 1, the one-wire non-volatile memory device 100 comprises a one-wire communication interface 110 coupled with a single-wire serial bus 165 and a non-volatile memory 180 to process data communication according to one-wire communication protocol. This protocol uses a single data line 165 for data communication between a master device 105 and a nonvolatile memory device 180. Herein, the term "single data line" 165, is also referred as "one-wire bus", "single-wire serial bus", "SDA", "SDATA", or "OUT". As shown in FIG. 1, the single data line 165 is coupled to a pull-up resister 170 which is connected to a power source Vcc. The master device 105 and the one-wire nonvolatile memory 100 have a common ground 160.

In accordance with one embodiment of the present invention, the one-wire communication interface 110 comprises an interface controller120, an internal clock oscillator 150, a first state machine 135 and a second state machine 155, as shown in FIG. 1. The interface controller 120 is coupled to the single-wire serial bus 165 for responding data communication between the system and the external master device 105. The interface controller 120 is also coupled to the first and the second state machine. The second state machine 155 is coupled to and driven by a first clock signal generated by the internal clock. Whereas the first state machine is coupled to the second state machine and the interface controller 120, and it is driven by a second clock signal defined by the falling edge 422 of a signal 420 shown in FIG. 4 on the single-wire serial bus. Herein, the "state machine" is also referred as "finite-state machine" or "FSM". An FSM is defined by a list of its states and transition from one state to another according to inputs. In a semiconductor system, a state machine can be constructed as an IC logic circuit.

It is beneficial to have the two separate state machines driven by different clocks to perform different levels of operational function. In one embodiment, the second state machine is configured to process bit signal communicated on the serial bus via the interface controller 120. For example. during a memory read operation, the second state machine drive the serial bus to send out bit signals to the external master device. For a memory write operation, the second state machine collects the data bits send by the master device and stores the bits in an internal buffer in the first state machine. The first state machine is configured to process byte information received from the second state machine. A byte is a collection of multiple bits. For example, one byte may have a collection of 8 bits. The number of bits in a byte depends on the communication protocol. A byte operation is referring to processing groups of bits in terms of a byte or multiple bytes (such as page). In one embodiment, the first state machine analyses the bit information as bytes received from the second state machine, and identifies the content of the byte, such as command, address, or data. Although the first and second state machine are driven by two different clocks at different frequencies, there are communication channels between them to pass information to each other. It will be appreciated from the following description that this configuration for the first and second machine improves communication efficiency and reliability, and it also ensures data integrity for memory read and write operation.

Figure 2:
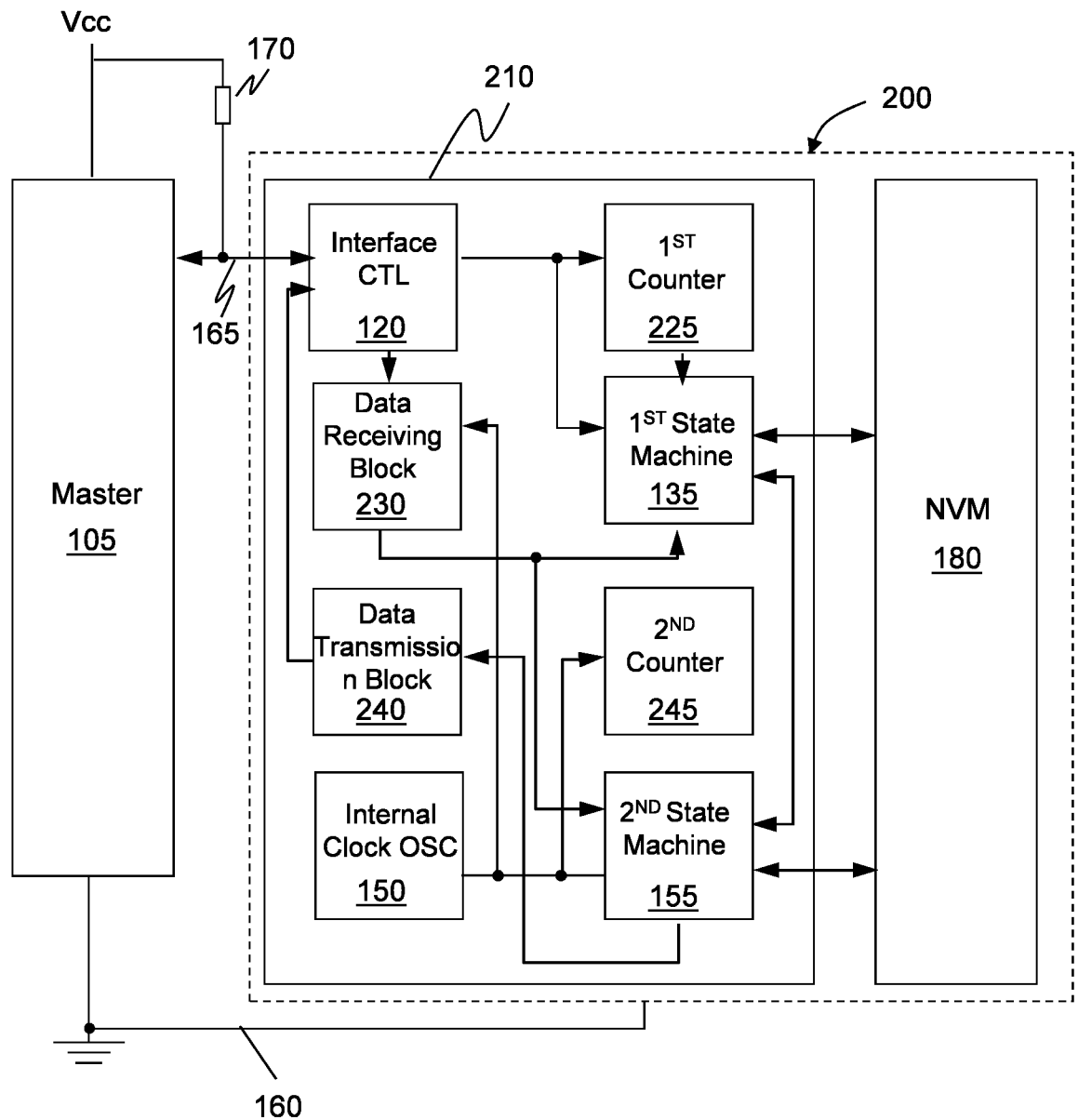
FIG. 2 is a functional block diagram illustrating a one-wire nonvolatile memory system according to an embodiment of the present invention

In an alternative embodiment according to the present invention, a one-wire communication interface 210 of system 200 may include additional elements. Shown in FIG. 2, the interface 210 comprises an interface controller 120, a data receiving block 230, a data transmission block 240, an internal clock oscillator 150, a first counter 225, a first state machine 135, a second counter 245, and a second state machine 155. The data receiving block 230 is coupled with the interface controller 120 and the second state machine 155, and it is configured to receive the bit information on the serial bus and to transmit the information to the first state machine. The data transmission block 240 is coupled with the interface controller 120 and the second state machine 155, and is configured to transmit bit information received from the second state machine to the single-wire serial bus. The first counter 225 is coupled with the interface controller 120 and the first state machine 135, and is configured to monitor the number of bits received by the first state machine to ensure data integrity. A second counter is coupled to the internal clock 150 and the second state machine 155 to monitor the time interval of a bit.

Figure 3:
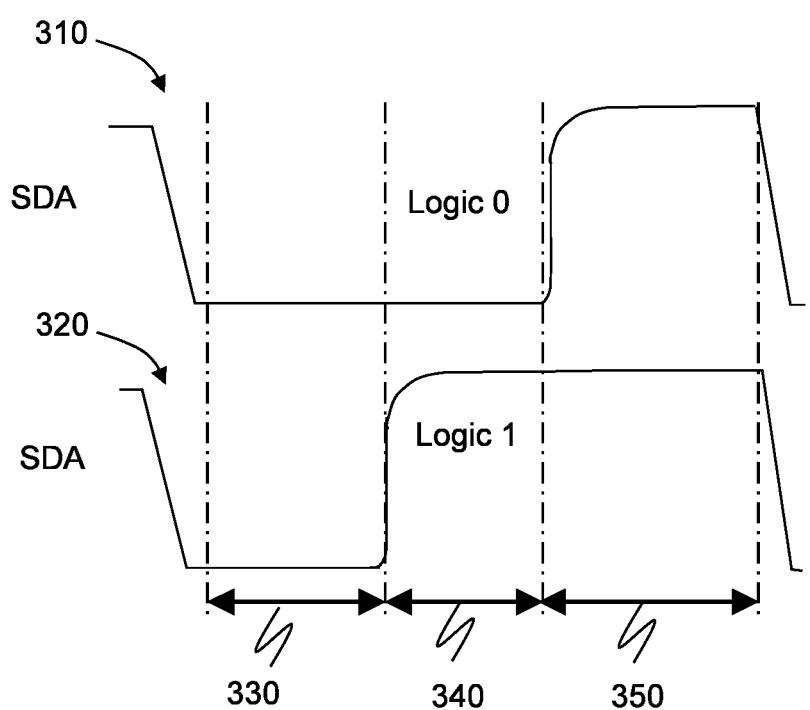
FIG. 3 illustrates signal waveforms of a bit on a single-wire serial bus according to an embodiment of the present invention.

Referring now to FIG. 3, the data signal waveform 310 and 320 is for a logic 0 and logic 1 bit communicated on the serial bus respectively. The waveform comprises a first 330, a second 340, and a third segment 350. During the first segment, the signal level for logic 0 and logic 1 bit is low. A low signal level on the serial bus is realized by pulled (or driven) down by the master device 105 and/or the one-wire memory system 100 or 200. During the second segment, the signal level is low for logic 0 and high for logic 1. During the third segment, the signal level is high for both logic 0 and 1. A high signal level is realized by releasing the control on the serial bus SDA and thereby the pull up resistor 170 will pull the level to Vcc.

The signal level on the serial bus is controlled by the master device 105 and/or the communication interface 110 or 210 of the one-wire memory system 100 or 200, depending on the direction of the communication. For example, when the one-wire memory system is transmitting bit information to the master device (for example, in memory read process), the master device drives the serial bus SDA to a low level during the first segment 330. Subsequently, the master releases the control and the communication interface controls the signal level (high for logic 1 and low for logic 0) in the second segment 340. In the third segment 350, both master and the communication interface release the control on the bus and thereby to let the one-wire bus being pulled to a high level through the pull-up resistor 170 to a power source Vcc. When the master device is transmitting bit information to the one-wire memory system (for example for a memory write process), the master device pulls the serial bus to a low level in the first segment, and the master device controls the level in the second segment. For the third segment, both master and the system release the control and allows SDA to be pulled to a high level.

Figure 4:
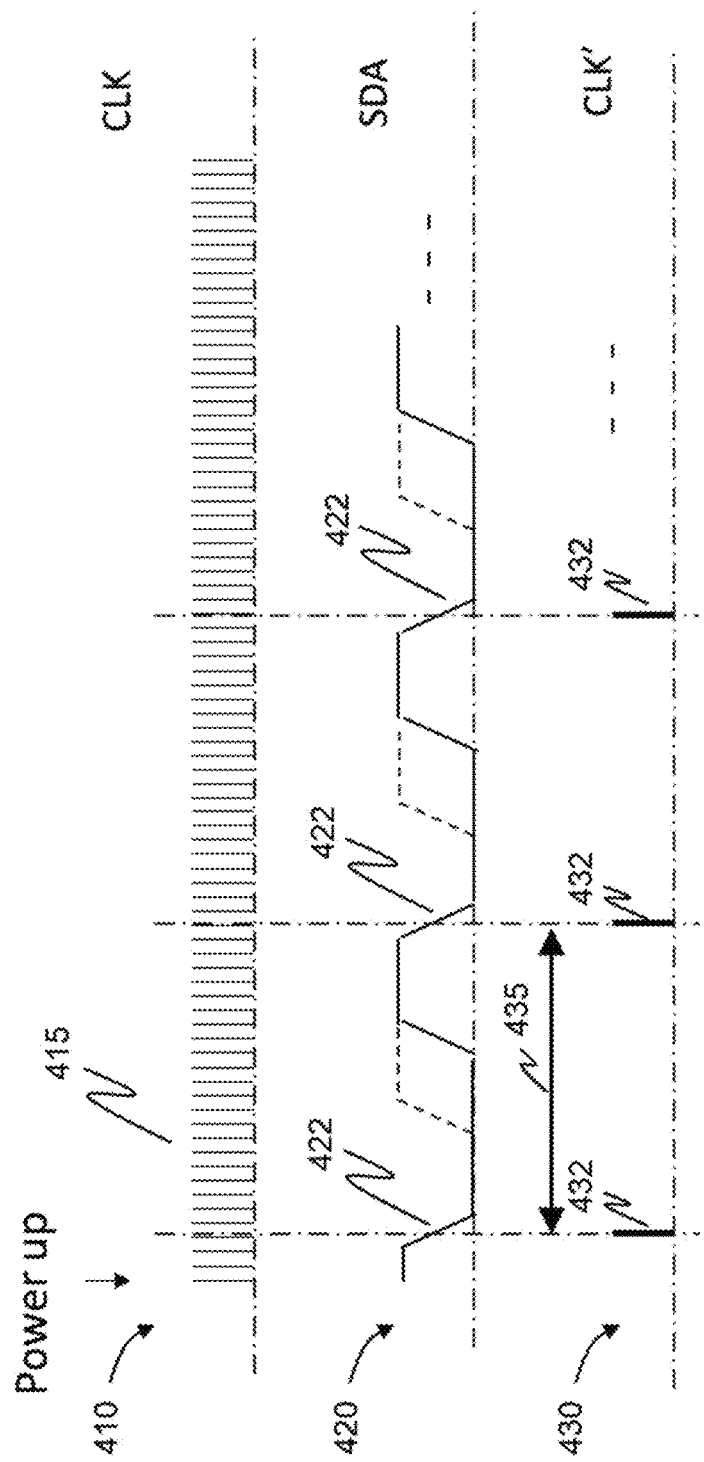
FIG. 4 includes timing diagrams illustrating the relationship between the first clock signal from the internal clock and the second clock signal generated by SDA signal in accordance with one embodiment of the present invention.

FIG. 4 are timing diagrams 410, 420, and 430, illustrating the relationship between a first clock signal 415 from the internal clock oscillator and a second clock signal 432 generated by the falling edge of the SDA signal in accordance with one embodiment of the present invention. In one embodiment, the frequency for the internal clock signal may be in a range of 100-500 MHz. The timing diagram 420 is data signal communicated on the serial bus SDA. The solid line is for logic 0 and the dash line represents logic 1 in the second segment of a bit frame. At the beginning of the first segment of a bit frame, every falling edge 422 on SDA produces the second clock ticks 432 with a period 435 which is one bit duration. The second clock signal 430 is used to drive the first state machine to receive the bit information from the second state machine and to form bytes to identify various operation modes, such as command, address, read or write operation. Whereas the second state machine is driven by the first clock signal 415 to process data signal, it is running at a much fast cycle compared with the first state machine. The timing relationship between the first and the second state machine will be further illustrated with reference to FIG. 5-FIG. 8.

Figure 5:
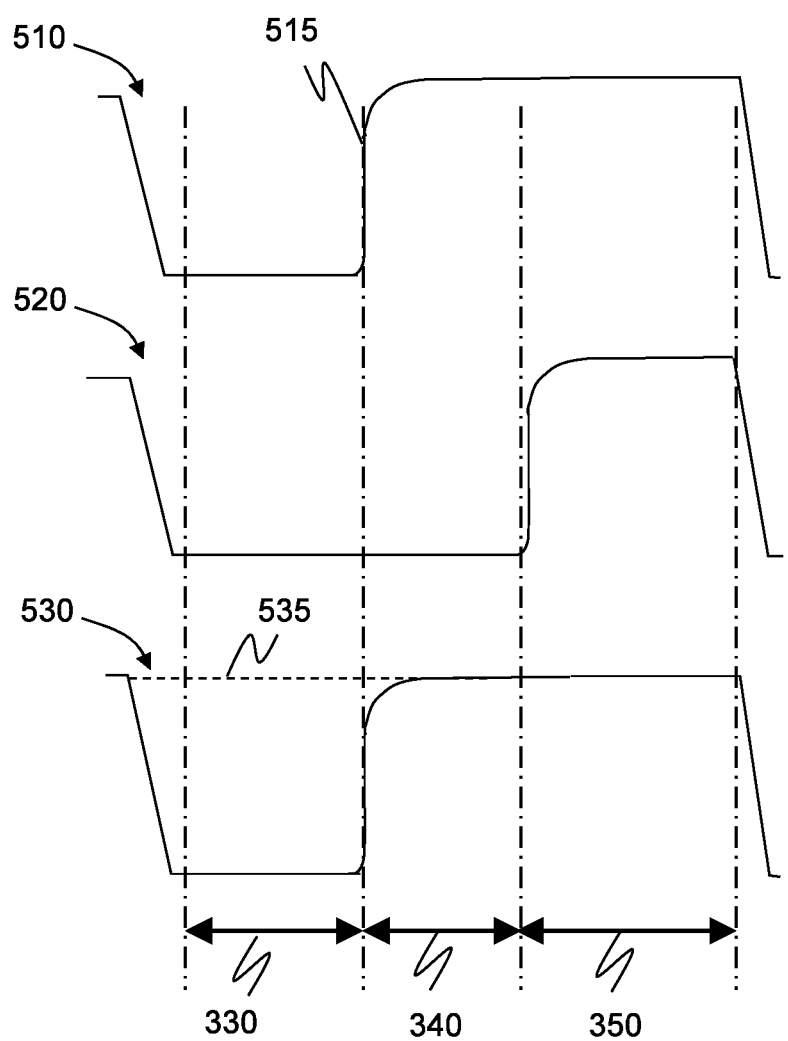
FIG. 5 illustrates a driving scheme for the transmission block to assist a master device in a memory read process in accordance with one embodiment of the present invention.

FIG. 5 shows the waveforms for read one bit from the memory. As shown in 510, when the master device releases the control of the serial bus at the transition moment 515 to the second segment 340, the serial bus will be pulled to a high level. However, if the read bit is logic 0, the release 515 may make a glitch on the serial bus, causing a logic error of the memory read. To avoid this potential error, the second state machine 155 instructs the transmission block 240 to drive the serial bus in parallel with the master device during the memory read operation. For logic 0, the transmission block keeps pulling down the serial bus to a low level from the beginning of the first segment 330 until the end of the second segment 340 of the bit frame, leading to a continuous low level on the serial bus between the first and the second segment (waveform 520). For logic 1 read, the transmission block releases the control of the serial bus in all three segments (dash line 535 in waveform 530), the master device will read logic 1 after it releases the serial bus in the second segment. The above arrangement results in a much more reliable communication interface.

Figure 6:
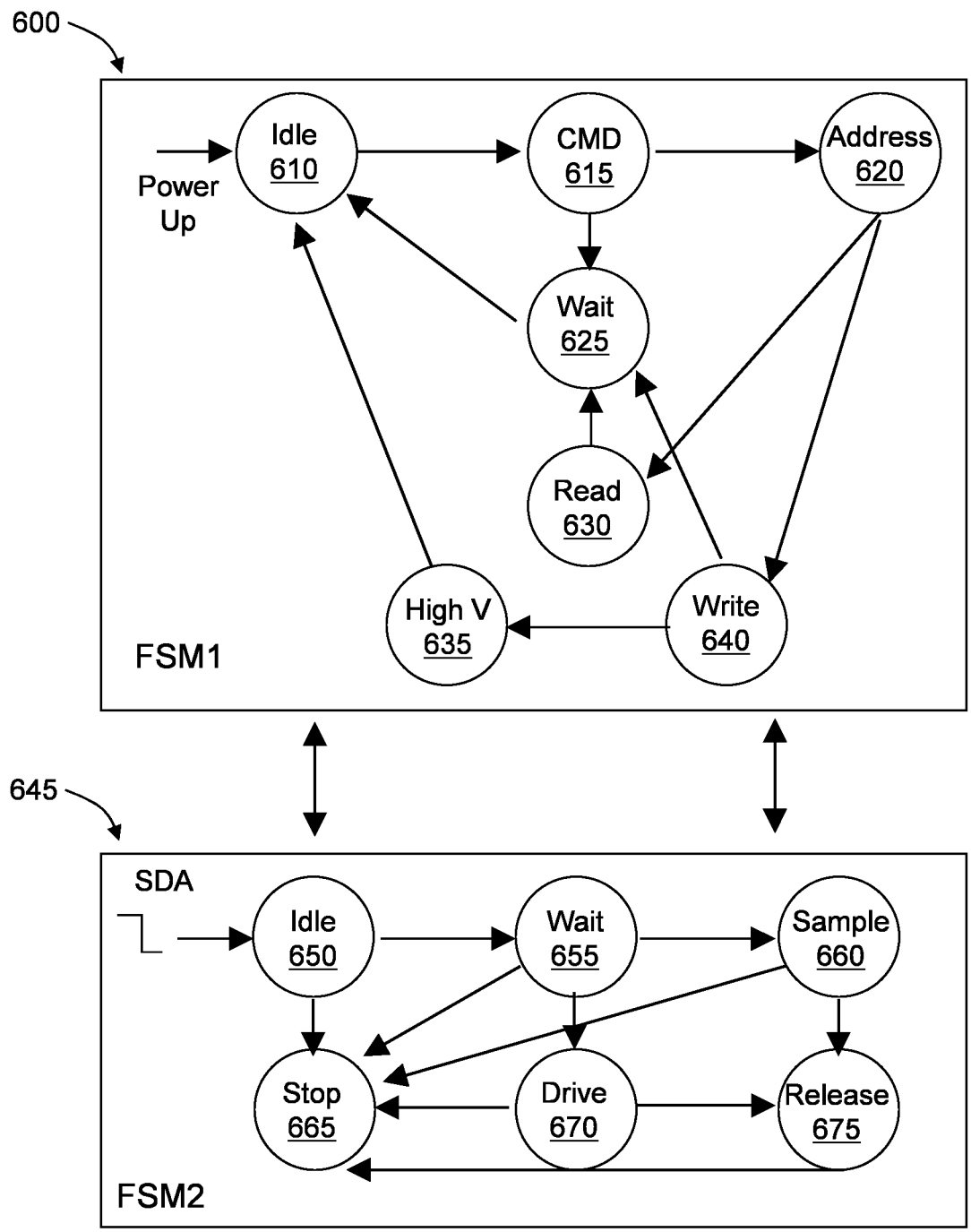
FIG. 6 includes transition diagrams of the first and second state machine in accordance with one embodiment of the present invention.

FIG. 6 shows transition diagrams of the first and second state machine in accordance with one embodiment of the present invention. The first state machine 600 comprises: an idle state 610, a command state 615, an address state 620, a wait state 625, a read state 630, a write state 640, and a high voltage state 635. The second state machine 645 comprises an idle state 650, a wait state 655, a sample state 660, a drive state 670, a release state 675, and a stop state 665.

Figure 7:
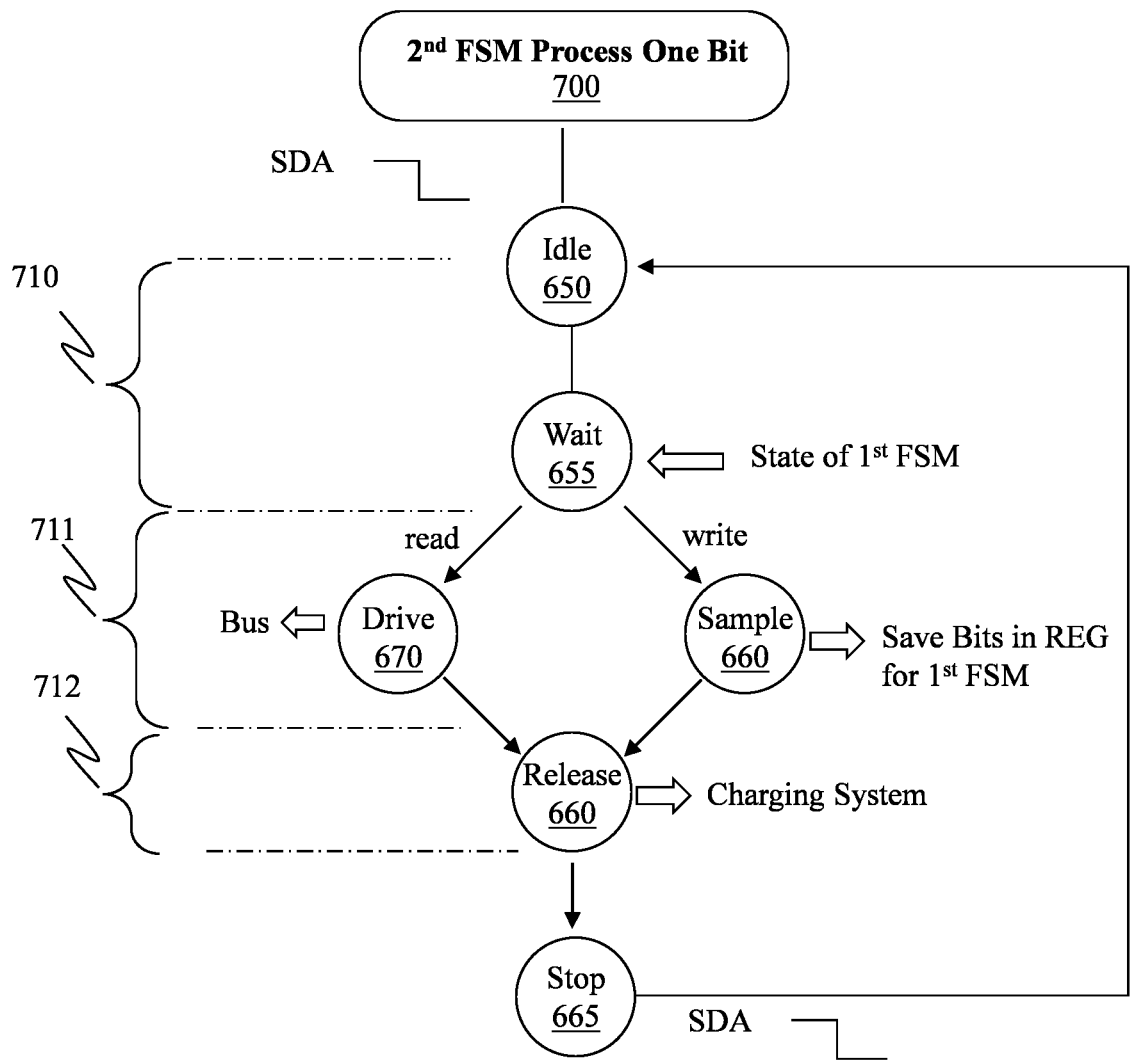
FIG. 7 is a transition diagrams of the second state machine in accordance with one embodiment of the present invention.

FIG. 7 is a transition diagrams for the second state machine to process one bit data signal in accordance with one embodiment of the present invention. For the second state machine, a data signal processing 700 starts from the idle state 650. If the system is just powered up, the second state machine goes to the idle state also. During the first segment 710 of the bit signal, the master device drives the one-wire serial bus to a low level, the second state machine changes to the wait state 655 until it receives the read or write state information from the first state machine. During the second segment 711 of the bit, the second state machine changes to the drive state 670 or the sample state 660 for a read or write memory operation respectively. For read operation, the second state machine controls the signal level on the serial bus 165 via the interface controller 120. For write operation, the second state machine saves the received bits in an internal buffer for the first state machine to perform write operation. During the third segment 712 of the bit, the second state machine changes to the release state 660 to allow the serial bus to float to a high level. During this period, the memory system can charge its power storage such as a battery or a capacitor through the pull up resistor 170 to Vcc. At the end of the third segment 712 of the bit, the second state machine changes to the stop state 665. The second state machine returns to the idle state 650 once it receives the second clock signal 432 formed by the falling edge of SDA signal.

In one embodiment according to the present invention, the second counter 245 (FIG. 2) further comprises an error handling function. When the time interval measured by the second counter is longer than the predetermined length, the second counter generates a stop signal immediately, resulting in a stop bit at an incorrect order in a byte sequence and the second state machine 155 will issue a command to erase data in all internal registers and buffers and to invalid the command. In fact, as shown in FIG. 6, every state may change to the stop state 665 when a predetermined condition is met.

Figure 8:
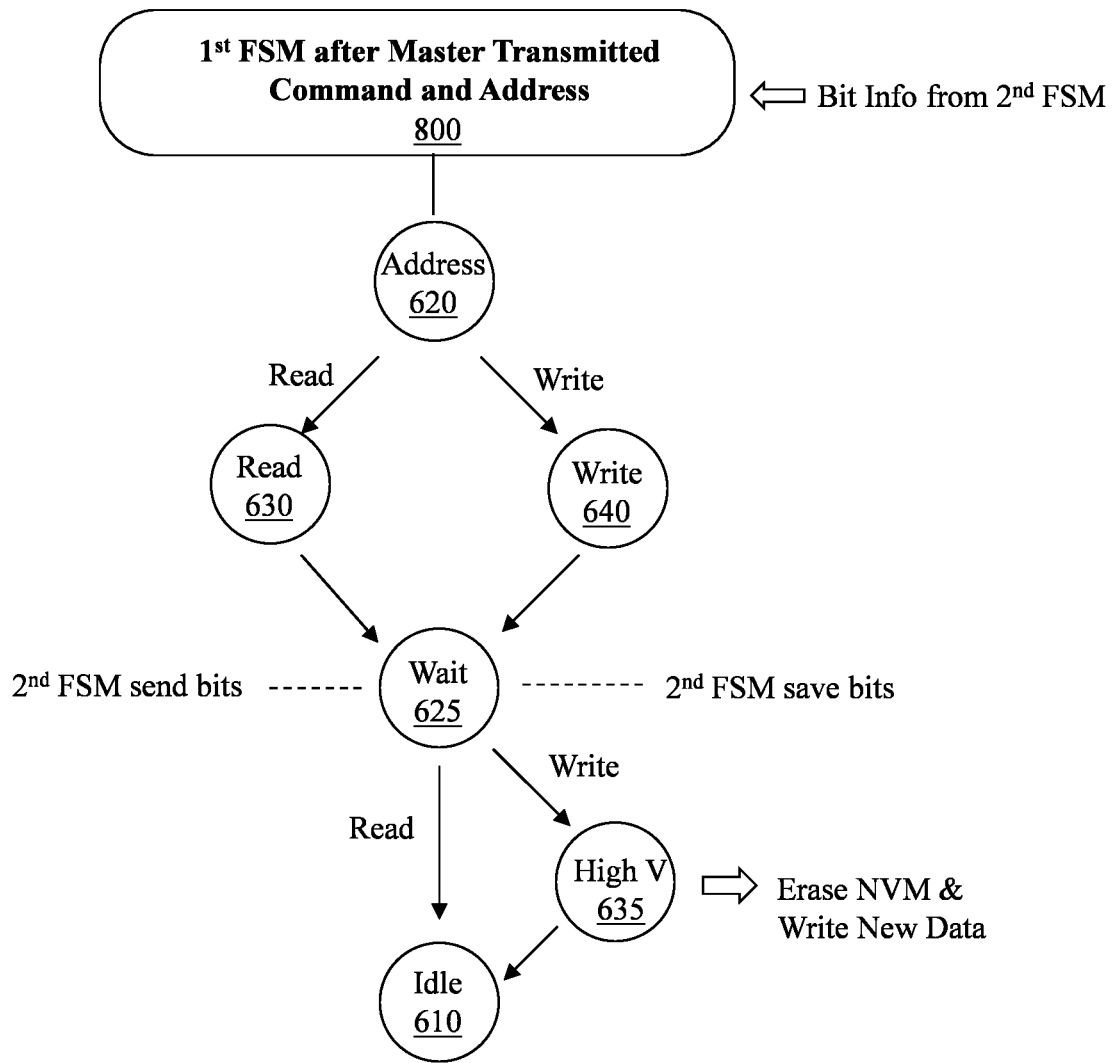
FIG. 8 is a transition diagrams of the first state machine in accordance with one embodiment of the present invention.

Referring back to FIG. 6, the first state machine starts a process from the idle state 510. Once the second state sends bit information, the first state machine loops through command state 615, wait state 624, and idle state 510 until it collects a set of bits to identify a valid command. FIG. 8 provides an illustration of transitions of the first state machine performing a memory read or write operation 800. The process starts from address state 620. For a memory write process, the first state machine goes to the write state 640, and then waits (wait state 625) for the second state machine to collect a set of the bits for write. Once the second state machine completes receiving all the bits it will detect a stop bit at a correct order which results in the first state machine to change to the high voltage state 635 to perform erase and write operation in the addressed portion of the nonvolatile memory.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

The invention claimed is:

1. A system comprising: a one-wire communication interface coupled with a single-wire serial bus and a non-volatile memory to process data communication according to one-wire communication protocol, wherein the one-wire communication interface comprising: an interface controller, an internal clock oscillator, a first and a second state machine;

wherein the first state machine comprises an idle state, a command state, an address state, a wait state, a read state, a write state, and a high voltage state, and the second state machine comprises an idle state, a wait state, a sample state, a drive state, a release state, and a stop state;

wherein the interface controller is coupled to one-wire serial bus and the first and the second state machine;

the second state machine is driven by a first clock signal generated by the internal clock oscillator, and is configured to process bit signal communicated on the serial bus via the interface controller;

the first state machine, coupled with the second state machine, is driven by a second clock signal defined by the falling edge of the data signal on the serial bus and is configured to process byte information received from the second state machine;

wherein a bit frame on the one-wire serial bus comprising a first, a second, and a third segment: the signal level for logic 0 and logic 1 bit are low during the first segment, and the level for logic 0 and logic 1 bit are high during the third segment, the level for logic 0 is defined by a low level and logic 1 is defined by a high level during the second segment;

during the first segment of a bit, a master device drives the single-wire bus and it pulls the bus to a low level, during the third segment of the bit, the master device and the interface both release the control on the bus and thereby to let the bus pulled to a high level through a pull-up resistor to a power source, during the second segment of the bit, when the interface is transmitting bit information to the master device, the master device releases the control on the bus and allows for the interface to control the level on the bus; whereas when the master device is transmitting bit information to the interface, the interface releases the control of the bus and allows for the master to take the control of the level on the bus;

wherein the one bit data signal operation by the second state machine comprising:

the second state machine starts from the idle state;

during the first segment of the bit, the master device drives the one-wire serial bus to a low level, the second state machine changes to the wait state until it receives the read or write state information from the first state machine;

during the second segment of the bit, the second state machine changes to the drive state or the sample state for a read or write operation respectively, wherein the second state machine controls the signal level on the bus via the interface controller for a memory read operation, and the second state machine saves the received bits in an internal buffer for the first state machine for a memory write operation, during the third segment of the bit, the second state machine changes to the release state to release the control on the serial bus which allows the bus to float to a high level, providing charging opportunity for the system;

at the end of the third segment of the bit, the second state machine changes to the stop state and then returns to the idle state upon the next SDA signal.

2. The system of claim 1, wherein the first state machine receives and analyses bit information received from the second state machine, and proceeds to the command state, the address state, and the read or write state according to the one-wire communication protocol, wherein for a write operation, the first state machine changes from the write state to the wait state to wait for the second state machine to collect and save all the bit data from the serial bus until detecting a stop bit at the correct order in the byte sequence, causing the first state machine to change from the wait state to the high voltage state to perform erase and write operation in the addressed portion of the nonvolatile memory.

3. The system of claim 1, wherein the one-wire communication interface further comprising:

a data receiving block coupled with the interface controller and the second state machine, and configured to receive the bit information on the serial bus and to transmit the information to the second state machine;

a data transmission block coupled with the interface controller and the second state machine, and configured to transmit bit information received from the second state machine to the single-wire serial bus, a first counter coupled with the interface controller and the first state machine, and configured to monitor the number of bits received by the first state machine and the order of the bit in a byte to ensure data integrity, a second counter coupled to the internal clock and the second state machine to monitor the time interval of a bit.

4. The system of claim 3 further comprising an error avoidance function wherein the second state machine and the transmission block are configured to drive the serial bus with the master device according to the falling edge of a data signal to avoid logic error during a read process.

5. The system of claim 3, wherein the second counter further comprises an error handling function comprising: when the time interval counted on the second counter is longer than the predetermined length, the second counter generates a stop signal immediately, resulting in a stop bit at an incorrect order in a byte sequence and the second state machine will issue a command to erase data in all internal registers and to invalid the command.

6. The system of claim 1, wherein the non-volatile memory is an EEPROM memory or a flash memory.

\* \* \* \* \*